United States Patent [19]

Perper

[11] 4,017,785
[45] Apr. 12, 1977

[54] POWER SOURCE FOR FLUORESCENT LAMPS AND THE LIKE

[75] Inventor: Lloyd J. Perper, Tucson, Ariz.

[73] Assignee: Iota Engineering Inc., Tucson, Ariz.

[22] Filed: Sept. 10, 1975

[21] Appl. No.: 611,897

[52] U.S. Cl. .................................. 321/4; 315/221; 321/20

[51] Int. Cl.² ...................................... H02M 5/458

[58] Field of Search ............... 315/205, 209 R, 221; 321/2, 4, 16, 18, 20; 331/113 A, 148

[56] References Cited

UNITED STATES PATENTS

| | | | |
|---|---|---|---|
| 3,242,414 | 3/1966 | Zelina | 321/18 |
| 3,818,308 | 6/1974 | Tamari | 321/18 X |
| 3,876,922 | 4/1975 | Forstbauer | 321/20 X |
| 3,909,696 | 9/1975 | Katou et al. | 321/18 X |

*Primary Examiner*—A. D. Pellinen
*Attorney, Agent, or Firm*—Harris, Kern, Wallen & Tinsley

[57] ABSTRACT

A power source for operating gas discharge lamps and other loads at high frequency, typically utilizing a 115 volt ac source rectified to provide a dc input in the order of 150 volts, and providing a 20,000 hertz output. An inverter with power supply, oscillator circuit and transformer, with conventional primary, secondary and feedback windings for operating the transistor oscillator. An additional output winding on the transformer with a rectifier and filter providing a supplemental dc supply connected to the main dc supply in parallel or in series to supplement a fluctuating main dc supply and maintain continuous oscillator operation while utilizing small filter capacitance and substantially reducing peak ac line current.

6 Claims, 6 Drawing Figures

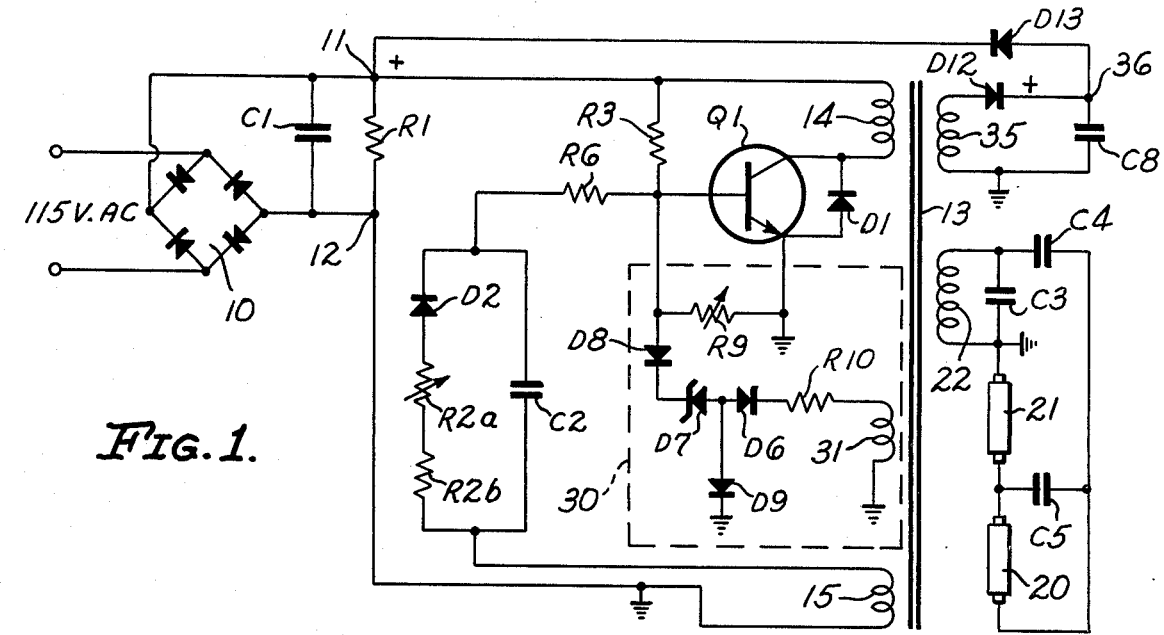
FIG. 1.
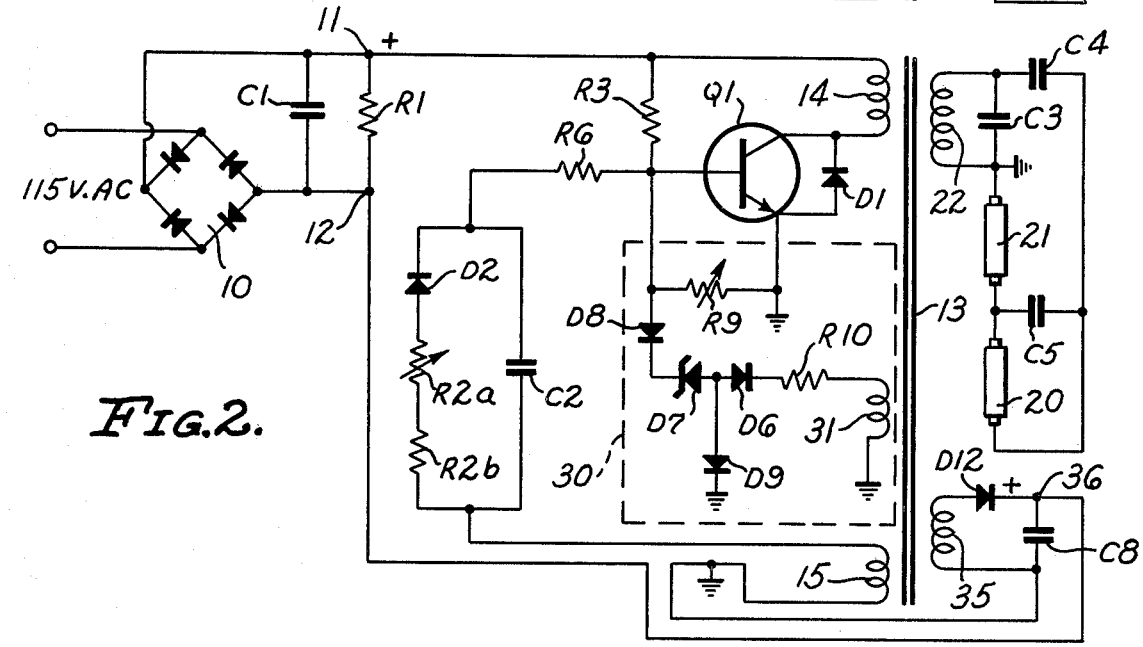
FIG. 2.
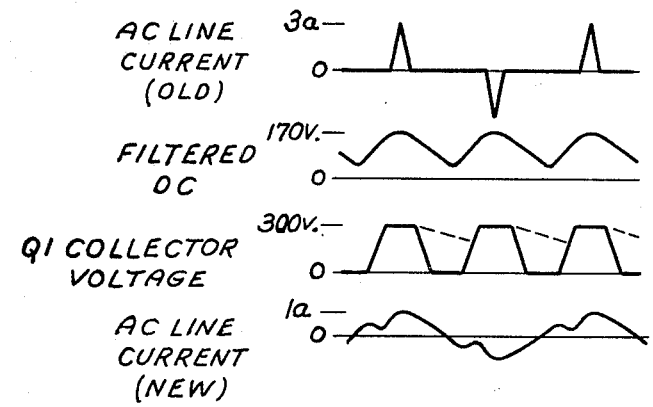
AC LINE CURRENT (OLD) — FIG. 3a.
FILTERED DC — FIG. 3b.
Q1 COLLECTOR VOLTAGE — FIG. 3c.
AC LINE CURRENT (NEW) — FIG. 3d.

POWER SOURCE FOR FLUORESCENT LAMPS AND THE LIKE

BACKGROUND OF THE INVENTION

This invention relates to a power source for gas discharge lamps and other loads operated at high frequency, and in particular is directed to a new and improved power source suitable for energizing fluorescent lamps and having a reduced peak ac line current. The present circuit is an improvement on those shown in U.S. Pat. Nos. 3,396,307 and 3,889,153, and those shown in copending applications Ser. No. 530,384, filed Dec. 6, 1974, now abandoned, and Ser. No. 596,069, filed July 15, 1975, and assigned to the same assignee as the present application.

The power source of the present invention has an inverter and a ballast circuit similar to those of the prior art devices. The prior art devices typically include a transistor oscillator circuit and a transformer, with a dc input voltage provided by an ac rectifier and filter circuit. The invention of the present application will be described herein as utilized with the power source of the aforesaid copending application Ser. No. 596,069, but it should be understood that the invention may also be used with other inverter power sources.

Inverter circuits have been improved so that some will operate over a wide range of dc supply voltages, thereby permitting the power supply filtering capacitor to be reduced to a very small value. The ac line current for the prior art power sources will have a triangular wave form, such as is shown in FIG. 3a and in one prior art circuit with a filtered capacitor in the order of 40 microfarads, the peak amplitude of the ac line is about 3 amperes. This triangular wave form results from the variable impendance loading of the inverter on the ac supply.

This relatively high peak primary ac current required by the prior art power source is sometimes undesirable because of the adverse effect on the requirements for the electrical distribution system in a building or an area utilizing the power source, especially when a large number of the power sources are utilized such as for the lighting of a large building.

It is an object of the present invention to provide a new and improved power source which will have the desirable operating characteristics of the prior art power sources while reducing the peak primary ac current requirements and thereby smoothing the ac loading on the distribution system.

SUMMARY OF THE INVENTION

The system of the present invention may be utilized with the conventional high frequency power source having an inverter with power supply, oscillator circuit and transformer, with the oscillator circuit including a transistor having emitter and collector electrodes connected in series with the primary winding across the dc terminals of the power supply and having the base and one of the electrodes connected across the feedback winding, with the secondary winding providing the oscillator output to the lamps. Another output winding is provided on the transformer with a rectifier and filter circuit connected across this output windjing for developing a dc voltage from the oscillator output. This dc voltage is connected in circuit with the dc voltage from the power supply in aiding relation to supplement the fluctuating output of the power supply. This permits operation of the power spply with a very low filter capacitor and a resultant substantial reduction in peak ac line current.

BRIEF DESCRIPTION OF THE DRAWING

FIG. 1 is a diagram of a fluorescent lamp circuit incorporating the presently preferred embodiment of the invention with a parallel configuration;

FIG. 2 is a diagram similar to that of FIG. 1 showing a series configuration; and FIGS. 3a–3d are wave forms illustrating the operation of the power source.

DESCRIPTION OF THE PREFERRED EMBODIMENTS

Referring to FIG. 1, a 115 volt ac supply is connected across a bridge rectifier 10 providing a rectified dc supply, typically 150 volts, across a filter capacitor C1 and resistor R1 at terminals 11, 12.

The inverter oscillator circuit includes a transformer 13 and transistor Q1, with the transformer primary winding 14 connected in series with the transistor collector and emitter across the dc input terminals 11, 12. The feedback winding 15 is connected between the terminal 12 and the transistor base through a drive circuit comprising diode D2 and resistors R2a, R2b in parallel with capacitor C2, with this parallel combination in series with resistor R6, and with another resistor R3 connected between the transistor base and the terminal 11. A diode D1 may be connected across the transistor collector and emitter electrodes for preventing negative voltage spikes from damaging the circuit.

Lamps 20, 21 are connected in series with capacitor C4 across the transformer secondary winding 22, with a capacitor C3 also connected across the winding 22 and with a capacitor C5 connected between capacitor C4 and the junction of the lamps 20, 21. Filament windings are not required for the circuit of the invention, but may be utilized if desired.

A level detector is shown in the dashed rectangle 30 and includes a control winding 31 on the transformer 13, with a circuit connected across the control winding and comprising resistor R10, diode D6, zener diode D7 and resistor R9. Diodes D8 and D9 may be used if desired, but are not necessary in the circuit. The junction of resistor R9 and diode D8 is connected to the base of the transistor Q1.

The circuitry described thus far is conventional and operates in the conventional manner and reference may be had to the aforementioned parents and applications for details of operation. When the ac power is turned on, the circuit oscillates and provides a high frequency output, typically 20 kilohertz, to the lamps.

Another winding 35 on the transformer 13 provides an output which varies as a function of the oscillator output. A diode D12 and a capacitor C8 are connected in series across the winding 35 providing a dc voltage at junction 36 and circuit ground.

This dc voltage is connected in parallel with the dc voltage from the power supply at terminals 11, 12, by diode D13. An alternative embodiment is shown in FIG. 2, where the dc voltage from the winding 35 is connected in series with the dc voltage from the power supply, such as between terminal 12 and circuit ground. The power source of FIG. 2 is otherwise the same as that of FIG. 1.

Typical values for components in the circuit of FIG. 1 are set out below by way of example and not for the purpose of limiting the invention.

| R1 | 100,000 ohms | D1 | IN40 |
|---|---|---|---|
| R2a | 500 ohms | D2 | IN40 |
| R2b | 130 ohms | D6 | IN40 |
| R3 | 39 ohms | D7 | zener diode, 12 volt |
| R6 | 43 ohms | D8 | IN40 |
| R9 | 510 ohms | D9 | IN40 |
| R10 | 39 ohms | D12 | IN4001 |
| C1 | .1 mf | D13 | IN4001 |
| C2 | .22 mf | Q1 | 2N6498 or 2N6499 |
| C3 | .0033 mf | lamps F-40T-12 | |
| C4 | .0068 mf | primary winding | 32 turns |
| C5 | .0005 mf | secondary winding | 90 turns |
| C8 | 50 mf | feedback winding | 2 turns |
| | | outputing winding | 24 turns |

The operation of the circuit involves the rectification of some of the generated high frequency energy, producing a supplemental dc supply that continues to drive the oscillator during low voltage portions of the fluctuating supply from 11, 12.

The advantage of including transistor Q1 as a feedback element in the production of its own dc supply is that the nonlinear impedance of Q1 draws current more evenly over the supply voltage cycle to charge capacitor C8 than would be the case if C8 were located in parallel with C1.

The disadvantage of including Q1 in this circuitry is that the introduction of the pro-rata energy losses of the oscillator reduces system efficacy typically by a few percent. In this design, this loss is traded off against distribution losses associated with normally high current peaks, and radio frequency radiation associated with sharp current peaks.

It should be noted in the circuit of FIG. 1 that diode D12 serves to charge capacitor C8, and diode D13 isolates the capacitor from the power source at 11 for charging purposes. In the circuit of FIG. 2, diode D13 is not used and C8 sets a minimum voltage level, to which the voltage across 11, 12 adds.

As discussed above, the prior art power source without the output winding 35 and with the capacitor C1 in the order of 40 microfarads will have an ac line current of triangular wave form with a peak height typically about 3 amperes, as illustrated in FIG. 3a. This peak current can be reduced by reducing the capacitor C1. With the capacitor C1 at about 1 microfarad, the peak current will be reduced to less than one-third, i.e., less than 1 ampere. With this small amount of filtering, the filtered dc appearing at terminals 11, 12 will have a wave form such as that shown in FIG. 3b.

With the power source of the prior art operating with the small filtering capacitor, the oscillator will turn off during that portion of the cycle when the amplitude of the dc supply drops below about +50 volts, resulting in an envelope voltage at the collector of the transistor Q1 such as shown in FIG. 3c, with mainly flat tops and gaps between the on pulses.

The circuit of the present invention provides a supplementary dc voltage for maintaining oscillator operation during the periods of low voltage from the main power supply. The oscillator output at winding 35 is rectified and filtered, providing a dc voltage at junction 36 which is then connected to the dc voltage from the main supply either in parallel as shown in FIG. 1, or in series as shown in FIG. 2. The oscillator then operates continuously, with the collector voltage following the dashed lines in FIG. 3c during the periods of low output from the main power supply. Thus the power source operates continuously providing the desired energy to the load while at the same time having a substantially reduced peak primary current requirement, with the ac line current wave form as shown in FIG. 3d.

In a typical circuit where the output of the main dc power supply as shown in FIG. 3b is in the order of 170 volts, the output winding 35 may be selected to develop in the order of 100 volts at the junction 36. The relative values may be increased or decreased as desired

I claim:

1. In a high frequency power source for a load such as gas discharge lamps, and having an inverter with power supply, oscillator circuit and transformer, said power supply having a first rectifier and filter circuit with ac input terminals and dc output terminals and providing a first dc voltage at said dc terminals, said transformer having primary, secondary and feedback windings, said oscillator circuit including a transistor having emitter and collector electrodes connected in series with said primary winding across said dc terminals and having the base and one of said electrodes connected across said feedback winding, the improvement comprising:
    an output winding on said transformer;
    a second rectifier and filter circuit connected across said output winding for developing a second dc voltage from the oscillator output; and
    first means for connecting said second dc voltage in circuit with said first dc voltage in aiding relation to supplement the fluctuating first dc voltage thereby reducing the ac line current peaks and the power factor at the ac input terminals.

2. A power source as defined in claim 1 wherein said second dc voltage is connected in series with said first dc voltage by said first means.

3. A power source as defined in claim 1 wherein said second dc voltage is connected in parallel with said first dc voltage by said first means.

4. A power source as defined in claim 1 wherein said second circuit includes a rectifier and a capacitor in series across said output winding, with said second voltage appearing across said capacitor.

5. A power source as defined in claim 4 wherein said first means includes an additional rectifier in series between like polarity terminals of said power supply and said second circuit.

6. A power source as defined in claim 1 wherein said second dc voltage is connected in parallel with said first dc voltage by said first means including a rectifier for blocking current from said power supply to said second circuit.

* * * * *